No. 614,585. Patented Nov. 22, 1898.
W. SMITH & G. G. DAVIS.
CAR BOLSTER.
(Application filed Jan. 8, 1898.)
(No Model.)
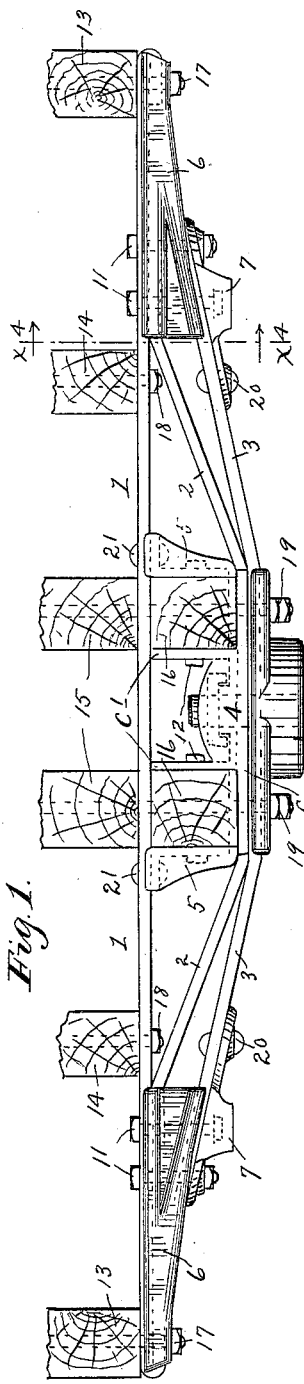
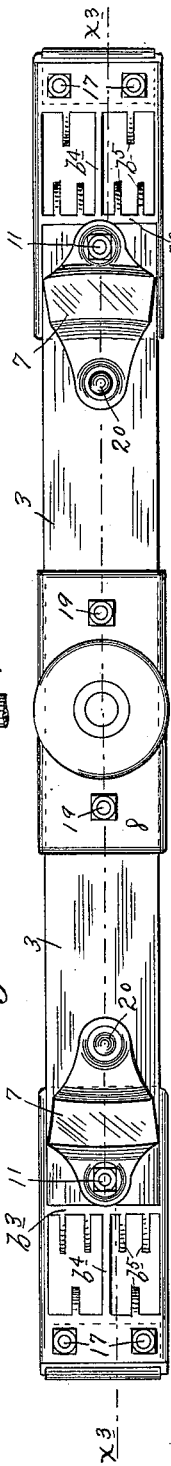
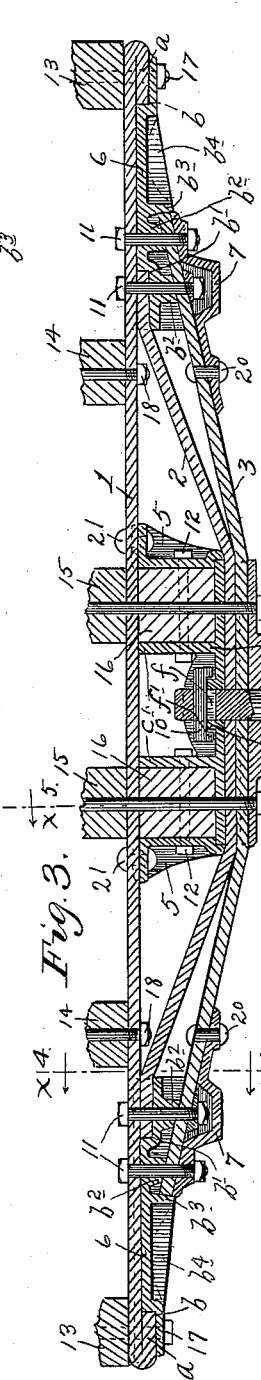
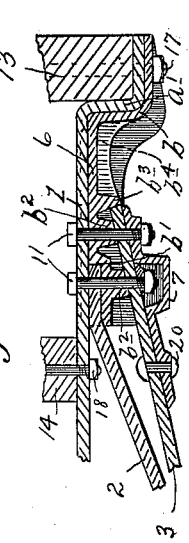
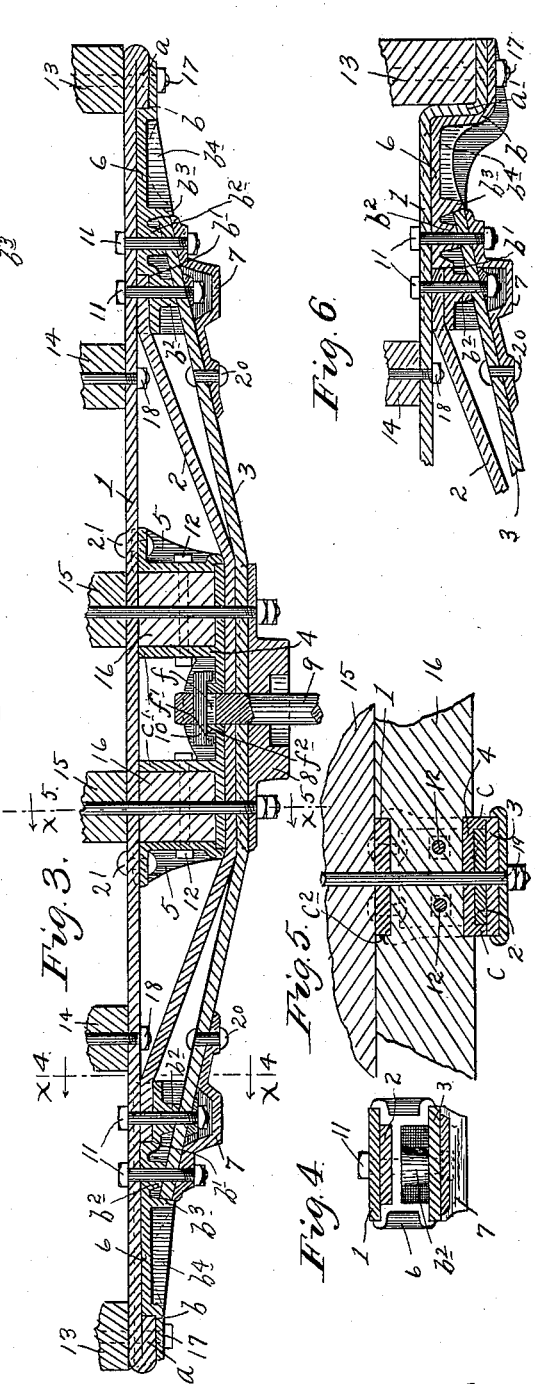
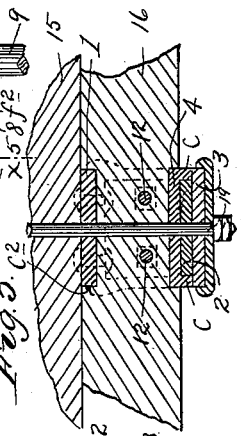
Witnesses.
C. F. Kilgore
R. D. Merchant
Inventors
William Smith
George G. Davis
By their Attorney
Jas. F. Williamson

UNITED STATES PATENT OFFICE.

WILLIAM SMITH AND GEORGE G. DAVIS, OF PROCTERKNOTT, MINNESOTA.

CAR-BOLSTER.

SPECIFICATION forming part of Letters Patent No. 614,585, dated November 22, 1898.

Application filed January 8, 1898. Serial No. 666,011. (No model.)

*To all whom it may concern:*

Be it known that we, WILLIAM SMITH and GEORGE G. DAVIS, citizens of the United States, residing at Procterknott, in the county of St. Louis and State of Minnesota, have invented certain new and useful Improvements in Car-Bolsters; and we do hereby declare the following to be a full, clear, and exact description of the invention, such as will enable others skilled in the art to which it appertains to make and use the same.

Our invention has for its object to provide an improved car-bolster.

To this end the invention consists of the novel features of construction hereinafter described, and defined in the claims.

The invention is illustrated in the accompanying drawings as the same appears when designed for use as a body-bolster.

In said drawings, like notations referring to like parts throughout the several views, Figure 1 is a view showing the bolster in end elevation and portions of the car-body, to which the bolster is secured, in cross-section. Fig. 2 is a bottom or underneath plan view of the bolster detached. Fig. 3 is a longitudinal vertical section on the line $x^3\,x^3$ of Fig. 2. Fig. 4 is a vertical cross-section on the line $x^4\,x^4$ of Figs. 1 and 3. Fig. 5 is a detail in vertical section on the line $x^5\,x^5$ of Fig. 3; and Fig. 6 is a view in longitudinal vertical section, substantially the same as Fig. 3, but illustrating a slight modification in construction.

The numeral 1 represents the main or horizontal member of the bolster.

The numeral 2 represents the intermediate or counterbrace member of the bolster.

The numeral 3 represents the main brace of the bolster.

The numeral 4 represents the main portion of the strut or center block, and 5 detachable sections which coöperate therewith.

The numeral 6 represents the bolster end brackets.

The numeral 7 represents the side bearings on the main brace of the bolster.

The numeral 8 represents the upper center plate, 9 the center pin, and 10 the center-pin key.

The numeral 11 represents bolts applied to secure together certain parts of the bolster.

The numeral 12 represents bolts applied to secure together the parts 4 and 5 of the center block or strut.

The numerals 13, 14, and 15 represent, respectively, the outside, the intermediate, and the center sills of the car.

The numeral 16 represents the draft-timbers of the car.

The numerals 17, 18, and 19 represent, respectively, the sill-bolts for the outside, the intermediate, and center sills of the car, which are applied as will be presently more fully noted.

Having regard now to the details of the bolster, the main or horizontal member 1 is shown as made up of a plain flat bar having its outer ends turned downward and inward to afford underlapping portions $a$. The intermediate or counter brace 2 is also shown as a plain bar properly shaped to afford a horizontal central section and inclined sections extending therefrom to the point of junction with the main member 1. The main brace 3 is also shown as a plain bar, but of greater width than the counterbrace 2, and is of the proper shape to afford a horizontal central section and inclined outer sections extending therefrom to the point of junction with the bolster and brackets 6.

The counterbrace 2 is of less length than the main brace 3, and the inclined portions of the said two braces stand at different angles in respect to the respective horizontal sections thereof. By the end brackets 6 and suitable rivets or bolts 11 the said brace members 2 and 3 are secured to the main member 1 at different points lengthwise of the said main member, and the central or horizontal portions of the said brace members 2 and 3 overlap each other and are spaced apart from the main member 1 by the center block or strut, which is shown as composed of the parts 4 and 5. The bolster end brackets 6 are preferably malleable castings of the proper form to embrace the three bolster members 1, 2, and 3 and interlock with the ends thereof, thereby serving to tie the bolster members together and afford end abutments to resist the spreading strains between the said parts, while at the same time reinforcing the outer end portions of the main bolster member 1. For the purposes just noted the said end brackets 6 are stepped, as shown at $b$, for underlapping and abutting against the underlapping portions $a$ or other suitable surface of the main bolster member 1, as best shown in Fig. 3; are stepped, as shown at $b'$, for underlapping and abutting against the outer end portions of the counterbrace or bolster member 2, and are provided with downwardly-extended ribs $b^2$ and $b^3$, which coöperate to overlap and abut against the outer ends of the main brace or bolster member 3. The sides of the end brackets 6 are, as shown, extended below and above the body or main horizontal web portions of said brackets for embracing the three bolster members 1, 2, and 3, as hitherto noted. The ribs $b^2$ space the main brace 3 apart from the counterbrace 2 and from the main bolster member 1, and said ribs $b^2$ are perforated for passing the bolts 11 for securing the said parts together. One of the said bolts 11 also passes through the side bearings 7 and coöperates, as shown, with rivets 20 for securing said side bearings to the under surface of the main brace 3 of the bolster. The said end brackets 6 are also shown as provided with downwardly-extended central ribs $b^4$, extending from the rib $b^3$ to the step $b$, and with short ribs $b^5$ between said central ribs $b^4$ and the side plates of said brackets. From the above-described construction it must be obvious that these end brackets 6 are of great strength in proportion to mass and that the abutting surfaces thereof, which resist the endwise strains on the bolster members 1, 2, and 3, will hold their form and position under the greatest load to which the bolster would be subject in service. It is obvious, for example, that the side plates, the center ribs $b^4$, and the short ribs $b^5$ all reinforce the main body of the casting 6 between the abutting surfaces $b$ and $b^3$, thereby affording an abundance of strength to these parts. The outside sill-bolts 17 are shown as extended through the bolster member 1 and the bracket 6, thereby assisting the short bolts 11 to secure the parts of the bolster together, while at the same time coöperating with the other sill-bolts 18 and 19 to secure the bolster to the car-body. The intermediate sill-bolts 18 are shown as extending only through the main bolster member 1, but in practice may extend through one or both of the brace members 2 and 3.

Having regard to the strut or center block, the main portion 4 is preferably in the form of a malleable casting having downturned short flanges $c$, adapted to embrace the counterbrace member 2 of the bolster and provided with upwardly-extended webs or flanges $c'$ of the proper height to space the body of the strut apart from the main bolster member 1. The said webs $c'$ are located at equal distances on opposite sides of the center of the strut and are adapted for location immediately inside or adjacent to the inner surfaces of the draft-timber 16. The detachable sections 5 are of the proper form to overset and interlock with the bottom or body portion of the main block 4 at their lower ends and to abut against the bolster member 1 at their upper ends. The bolts 12 pass through the detachable sections 5 and the vertical web $c'$ of the main block 4 and are also shown as extending through the draft-timbers 16. Said detachable sections 5 are secured by rivets 21 or otherwise at their upper ends to the main bolster member 1. The draft-timbers 16 are gained, as shown at $c^2$ in Fig. 6, for affording the countersunk seat or passage-way to the main bolster member 1, while preserving close contact between the center sills 15 and said draft-timbers 16.

The above-described construction of the strut-block 4, with its vertical webs $c$ rising from its body portion and spaced apart equal distances on opposite sides of the center of the strut, enables the same to be readily applied in working position while permitting the draft-timbers to extend through the strut and affording clearance for the application of the king-bolt or center pin 9.

Instead of the draft-timbers 16 other suitable draft-riggings might of course be applied with the same extending through the strut.

The center plate 8 is of the proper construction to embrace the bolster to afford a seat or passage for the center pin 9 and to coöperate with a suitable lower center plate. (Not shown.) With the center plate 8 secured to the bolster, as shown in the drawings, the said center plate serves to reinforce the central part of the bolster. As shown, the central sill-bolts 19 are made to secure together the center plate 8 and the parts 1, 2, 3, and 4 of the bolster. Although the sections 5 of the strut have been shown as detachable from the main block 4, it will be understood that the said sections might be formed as vertical webs or flanges integral with the body portion 4 of the strut.

The king-bolt or center pin 9 has its pin-passage $f$ of greater depth than the depth of the central part of the key 10. The key 10 has downwardly-extended end flanges or lugs $f'$. The body of the center block or strut 4 is provided with a raised flange $f^2$, surrounding the passage therein for the center pin 9. This construction permits the center pin 9 to be applied and removed from underneath the car, and when the pin and the key are in position the parts will interlock, as best shown in Fig. 3, under the action of gravity. Otherwise stated, the key-lugs $f'$ will engage with the raised flange $f^2$ on the strut, and thereby prevent displacement of the key and hold the center pin 9 in its proper working position.

In the modification shown in Fig. 6 the main member 1 of the bolster is shown as stepped or bent downward and outward for abutting and underlapping the outside sill 13 and for affording an abutting surface for the bolster end brackets 6, as shown at $a'$, and the bolster end bracket 6 is made of larger size at its step $b$ for coöperation with the said modified form of bolster member 1. Otherwise than in the respects above noted the construction and action of the modification shown in Fig. 6 are substantially the same as in the construction shown in the main views. The purpose of this modification (illustrated in Fig. 6) is to adapt the bolster to that form of car construction wherein the outside sills 13 are dropped to a lower level or are of greater depth than the intermediate and the central sills of the car.

From the foregoing description it is obvious that we have provided a bolster of great rigidity and strength, which is at the same time comparatively cheap to make. These facts have been demonstrated by the most severe tests for determining rigidity and strength, and the efficiency of the bolster has also been demonstrated by actual service under heavy loads.

While the invention has been illustrated and described as the same is designed for a body-bolster, it will be understood that by changes within the skill of an ordinary mechanic familiar with car construction the bolster could be readily adapted for use as a truck-bolster. Hence the word "car-bolster" as used in this specification is intended to be broad enough to cover either a body or a truck bolster. It will also be understood that other forms and kinds of metal might be substituted for the kinds and forms shown, that rivets might be substituted for bolts in many instances, and many of the other details might be changed without departing from the spirit of our invention. For example, instead of malleable castings for the strut and the end brackets steel castings might be employed, and instead of the plain flat bars for the bolster members 1, 2, and 3 bars of channel or angular form in cross-section might be substituted. It should further be noted that the feature of this bolster which permits the draft-timbers 16 or other substitute draft-riggings to pass through the bolster could be readily secured even if the bolster was cast solid instead of being made up of separate parts, as disclosed; and hence this feature of a bolster, with a passage or pocket for the draft-timbers or draft-rigging, is intended to be claimed, broadly, herein.

What we claim, and desire to secure by Letters Patent of the United States, is as follows:

1. In a car-bolster, the combination with the main member, of a plurality of thrust braces or members secured together and secured to said main member at different points on the opposite sides of its center, substantially as described.

2. In a car-bolster, the combination with a main member, of a plurality of thrust braces or members secured together at their central portions and secured to said main member at different points on the opposite sides of its center, and a strut or center block secured to and spacing the central portions of said thrust member apart from said main member, substantially as described.

3. In a car-bolster, the combination with a main member and one or more brace members, of end brackets applied to reinforce the outer ends of the main member and secure the brace members thereto.

4. In a car-bolster, the combination with a main member and a pair of brace members, of a strut or center block between said main and brace members, and end brackets applied to reinforce the outer ends of the main member and to connect said brace members thereto at different points lengthwise thereof, substantially as described.

5. In a car-bolster, the combination with a main member and a pair of brace members, of a strut or center block between the main and the brace members, and end brackets applied to secure the outer ends of the brace members to the main member and constructed to afford abutting surfaces for interlocking with the ends of said bolster members, substantially as described.

6. In a car-bolster, the combination with a main member and a pair of brace members, of a strut or center block between said main and brace members, and end brackets constructed to embrace the outer end portions of said three bolster members, and to afford abutting surfaces for interlocking therewith, substantially as described.

7. In a car-body bolster, the combination with a main member and one or more brace members, of a strut or center block between said main and brace members, which block is made up of the main portion 4 having the webs $c'$ and the detachable sections 5, coöperating to space apart said bolster members and afford a passage-way for the draft-rigging, substantially as described.

8. The combination with the bolster members 1, 2 and 3, of the strut or center block made up of the main portion 4 having the downturned flanges $c$ and the upwardly-extending flanges $c'$ and of the detachable sections 5, coöperating with said main portions, 4, substantially as described.

9. The combination with a car-body bolster having a king-bolt plate below the floor-level and provided with a raised flange $f^2$ surrounding the bolt-passage therein, of the king-bolt 9 having the elongated pin-passage $f$, and the pin $f'$ having the downturned end lugs $f'$ for engaging over said flange $f^2$ to lock said parts in working position, substantially as described.

In testimony whereof we affix our signatures in presence of two witnesses.

WILLIAM SMITH.
GEORGE G. DAVIS.

Witnesses:
FRANK D. ADAMS,
JOSEPH B. COTTON.